United States Patent
Thrash et al.

(10) Patent No.: US 11,536,612 B1
(45) Date of Patent: Dec. 27, 2022

(54) TEMPTECH

(71) Applicant: Venture Technologies, LLC, Calera, AL (US)

(72) Inventors: Justin Thrash, Calera, AL (US); Josh Deal, Calera, AL (US)

(73) Assignee: Venture Technologies, LLC, Calera, AL (US)

( * ) Notice: Subject to any disclaimer, the term of this patent is extended or adjusted under 35 U.S.C. 154(b) by 0 days.

(21) Appl. No.: 17/847,742

(22) Filed: Jun. 23, 2022

Related U.S. Application Data

(63) Continuation of application No. 17/585,668, filed on Jan. 27, 2022, which is a continuation of application No. 16/601,271, filed on Oct. 14, 2019, now abandoned.

(51) Int. Cl.
*G01J 5/00* (2022.01)
*G01J 5/02* (2022.01)
*G01V 8/10* (2006.01)
*G01J 5/10* (2006.01)

(52) U.S. Cl.
CPC ............. *G01J 5/025* (2013.01); *G01J 5/0205* (2013.01); *G01J 5/028* (2013.01); *G01J 5/10* (2013.01); *G01V 8/10* (2013.01)

(58) Field of Classification Search
CPC .......... G01J 5/025; G01J 5/0205; G01J 5/028; G01J 5/10; G01J 5/00; G01V 8/10
See application file for complete search history.

(56) References Cited

U.S. PATENT DOCUMENTS

| | | | |
|---|---|---|---|
| 2,947,171 A | 8/1960 | Peltola | |
| 3,651,694 A | 3/1972 | Lamb | |
| 3,753,259 A | 8/1973 | Donovan | |
| 4,379,461 A * | 4/1983 | Nilsson | G01K 1/022 346/33 TP |
| 4,901,061 A | 2/1990 | Twerdochlib | |
| 4,984,904 A | 1/1991 | Nakano et al. | |
| 5,165,235 A | 11/1992 | Nitschke | |
| 5,406,939 A | 4/1995 | Bala | |
| 5,653,239 A | 8/1997 | Pompei et al. | |

(Continued)

FOREIGN PATENT DOCUMENTS

| | | |
|---|---|---|
| CN | 205643218 | 10/2016 |
| CN | 113625089 | 11/2021 |

(Continued)

OTHER PUBLICATIONS

*SoCal Dab Tools, LLC d/b/a Dab Rite and Samuel L. Morris, III vs. Venture Technologies, LLC d/b/a Temptech*, U.S. District Court for the Middle District of Alabama, Northern Division, Civil Action No. 2:22-cv-128; Plaintiffs' Opposition to Venture Technologies' Motion to Dismiss the First Amended Complaint, May 31, 2022, pp. 1-18.

(Continued)

*Primary Examiner* — Gail Kaplan Verbitsky
(74) *Attorney, Agent, or Firm* — Jessica L. Zurlo; Jake M. Gipson; Bradley Arant Boult Cummings LLP

(57) ABSTRACT

The present invention is an apparatus for collecting infrared temperature readings. The proposed embodiment provides a unique approach for users to easily collect critical heat data. The embodiment may even be used for both medical and recreational purposes.

18 Claims, 6 Drawing Sheets

(56) References Cited

U.S. PATENT DOCUMENTS

| | | | |
|---|---|---|---|
| 6,001,066 A | 12/1999 | Canfield et al. | |
| 6,080,972 A | 6/2000 | May | |
| 6,286,992 B1 | 9/2001 | Kyrtsos | |
| 6,351,217 B1 | 2/2002 | Kuhn | |
| 6,591,103 B1 | 7/2003 | Dunn et al. | |
| 6,771,373 B2 | 8/2004 | Schenkl et al. | |
| 6,837,616 B2 | 1/2005 | Ignatowicz | |
| 7,364,355 B2 | 4/2008 | Ignatowicz | |
| 7,520,668 B2 | 4/2009 | Chen | |
| 8,212,189 B2* | 7/2012 | Imura | H05B 1/0261 |
| | | | 219/412 |
| 8,591,103 B2 | 11/2013 | Lane et al. | |
| 8,834,019 B2 | 9/2014 | Fraden | |
| 11,187,586 B2 | 11/2021 | Wynick et al. | |
| 2003/0007544 A1 | 1/2003 | Chang et al. | |
| 2004/0013164 A1 | 1/2004 | Li | |
| 2004/0141543 A1 | 7/2004 | Jensen et al. | |
| 2005/0018744 A1 | 1/2005 | Schonlein et al. | |
| 2005/0025213 A1 | 2/2005 | Parks | |
| 2005/0111520 A1 | 5/2005 | Ignatowicz | |
| 2005/0229611 A1 | 10/2005 | Welch | |
| 2006/0026971 A1 | 2/2006 | Sharpe | |
| 2007/0008119 A1 | 1/2007 | Pohle et al. | |
| 2008/0080593 A1 | 4/2008 | Lane et al. | |
| 2008/0175301 A1 | 7/2008 | Chen | |
| 2008/0259993 A1 | 10/2008 | Blakeley | |
| 2011/0271738 A1* | 11/2011 | McGill | G01N 21/64 |
| | | | 250/338.5 |
| 2012/0152246 A1 | 6/2012 | Yomtov | |
| 2015/0036719 A1 | 2/2015 | Koduri | |
| 2015/0110153 A1* | 4/2015 | Hoblit | G06K 7/14 |
| | | | 374/141 |
| 2016/0061807 A1 | 3/2016 | Ravishankar et al. | |
| 2016/0116348 A1 | 4/2016 | Lee et al. | |
| 2016/0161420 A1 | 6/2016 | Zhu et al. | |
| 2017/0052070 A1 | 2/2017 | Marsh et al. | |
| 2017/0329125 A1 | 11/2017 | Churovich | |
| 2018/0077967 A1 | 3/2018 | Hatton et al. | |
| 2018/0110938 A1 | 4/2018 | Trzecieski | |
| 2018/0321622 A1 | 11/2018 | Yoshimura | |
| 2018/0325381 A1 | 11/2018 | Abreu | |
| 2019/0195616 A1 | 6/2019 | Cao et al. | |
| 2019/0274192 A1 | 9/2019 | Fryshman | |
| 2020/0000143 A1 | 1/2020 | Anderson et al. | |
| 2020/0053259 A1 | 2/2020 | Mueckl et al. | |
| 2020/0146361 A1 | 5/2020 | Silver et al. | |
| 2020/0238027 A1 | 7/2020 | Raichman | |
| 2020/0269267 A1 | 8/2020 | Bessant et al. | |
| 2020/0323791 A1 | 10/2020 | Santos et al. | |
| 2020/0330706 A1 | 10/2020 | Greenfield | |
| 2020/0368379 A1 | 11/2020 | Agarwal | |
| 2021/0069756 A1 | 3/2021 | Lukac et al. | |
| 2021/0116304 A1 | 4/2021 | Wynick et al. | |

FOREIGN PATENT DOCUMENTS

| | | |
|---|---|---|
| EP | 3022137 | 4/2019 |
| JP | S62101334 U | 6/1987 |
| JP | H10304576 | 11/1998 |
| JP | 2002315738 | 10/2002 |
| JP | 2004323141 | 11/2004 |
| JP | 4862647 | 7/2008 |
| WO | 9425841 | 11/1994 |
| WO | 9940417 | 8/1999 |
| WO | 02103306 | 12/2002 |
| WO | 2019226052 | 11/2019 |

OTHER PUBLICATIONS

*SoCal Dab Tools, LLC d/b/a Dab Rite and Samuel L. Morris, III vs. Venture Technologies, LLC d/b/a Temptech*, U.S. District Court for the Middle District of Alabama, Northern Division, Civil Action No. 2:22-cv-128; Venture Technologies, LLC's Motion to Dismiss Plaintiffs' First Amended Complaint, May 10, 2022, pp. 1-30.

*SoCal Dab Tools, LLC d/b/a Dab Rite and Samuel L. Morris, III vs. Venture Technologies, LLC d/b/a Temptech*, U.S. District Court for the Middle District of Alabama, Northern Division, Civil Action No. 2:22-cv-128; Venture Technologies, LLC's Reply in Support of Its Motion to Dismiss Plaintiffs' First Amended Complaint, Jun. 8, 2022, pp. 1-13.

Claim chart of U.S. Appl. No. 17/585,668 as it relates to U.S. Patent Publication No. 2018/0325381 filed on May 7, 2018.

Claim chart of U.S. Appl. No. 17/585,668 as it relates to U.S. Patent Publication No. 2019/0274192 filed on Apr. 24, 2019.

Claim chart of dependent claims of U.S. Appl. No. 17/585,668 as it relates to U.S Patent Publication No. 2018/0325381.

TempTech, User Guide, Aug. 31, 2018, Available at: https://web.archive.org/web/20180831094329/https://temptech.org/.

International Search Report and Written Opinion dated Mar. 23, 2021 of International Patent Application No. PCT/US2021/012142.

\* cited by examiner

TEMPTECH

CROSS-REFERENCE TO RELATED APPLICATIONS

None.

BACKGROUND OF THE INVENTION

Field of the Art

The disclosure relates to a hands-free infrared temperature reader. The embodiment allows the user to easily and consistently know the temperature at which they are consuming CBD/THC concentrates in a convenient posture.

Discussion of the State of the Art

The CBD industry is a lucrative industry that garnered much attention over the last decade by legalizing cannabis and other related products in various states for medicinal and even recreational purposes with Illinois becoming the latest state to legalize cannabis. As a result of the industry growth there is an increased need for supplemental devices since the current products are either outdated or cumbersome. To elaborate, prior attempts at using a device such as a forward facing or horizontal angled infrared gun for reading the temperature of small objects required the user to hold the device in position fixed on objects as small as ~25-30 mm was very inconvenient. At other times, users have been known to use devices such as an hourglass or similar product which poses its own challenges not to mention the inaccuracies associated.

The challenge that many consumers have with traditional methods of measuring the temperature of CBD/THC as they are consuming, is that the user has to hold the device for several minutes fixed on an object referred to as a dish. The dish is an apparatus that users utilize to hold the CBD/THC concentrates while it is heated for purposes of consuming. The act of holding the device fixed on the dish at a certain angle can be very awkward. Traditionally, the method of using infrared thermometers involve the user pointing the device and holding a trigger, but this method is not an efficient process due to the possibility mistakes. To elaborate, a person's hand can shake frequently during a short period of time causing an inaccurate reading. Alternatively, where a device is designed in such a way that it can be placed on a fixed object such as a stationary table then this will eliminate the movement associated with a person's hand. To make things even more challenging when users "dab" which is considered the act of consuming TCH at much higher temperatures than normal, medical professionals have found that this can cause cancer. As a result, using prior inaccurate devices can prove to be very harmful and may even lead to death.

Accordingly, what is needed in the art is a hands-free apparatus to provide an overall efficient experience for users. What is further needed in the art is an apparatus that can be placed in a stationary position with two infrared sensors for collecting temperature data of CBD/THC concentrates. One sensor is designed as an upright or vertical facing device in a fixed position where the second sensor can be designed as an arm that can be moved in an upward or downward position that provides a method for individuals to access an infrared reader without difficulty by placing the CBD/THC dish positioned above the fixed upright sensor or below the moveable infrared sensor device. What is further needed in the art is a reliable and accurate method of scanning temperature that will drastically decrease the risk of overheating while consuming CBD/THC that will be convenient and provide a pleasurable experience for the user.

SUMMARY OF THE INVENTION

Accordingly, the inventor has conceived, in a preferred embodiment of the invention, an apparatus for accurately reading the temperature of CBD/THC concentrates or products without the need for holding and aiming a forward facing traditional infrared thermometer typically referred to as an infrared gun.

According to a preferred embodiment of the invention, the apparatus provides an efficient and practical way for users to determine the temperature of CBD/THC isolates. The embodiment comprises a device that can be placed on a flat surface which includes an upright device that is used as an infrared temperature scanning device. The user will be able to hold the heated CBD/THC dish, without worry of inaccuracy, over the center of an upright vertical device with an orifice along the top surface for monitoring temperature readings. In a non-limiting alternative, the apparatus can also be designed with an arm that has the capability to provide infrared scanning capabilities by being adjusted above the dish in a manner that would allow scanning capabilities below the dish or in the top portion of the dish. The arm maybe fixed in either an upward or downward position by utilizing lock mechanisms and can be placed in a free state for movement at the will of the user.

In an ideal embodiment, the TempTech will provide a very user-friendly option to previous methods of using traditional infrared thermometers.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 5:
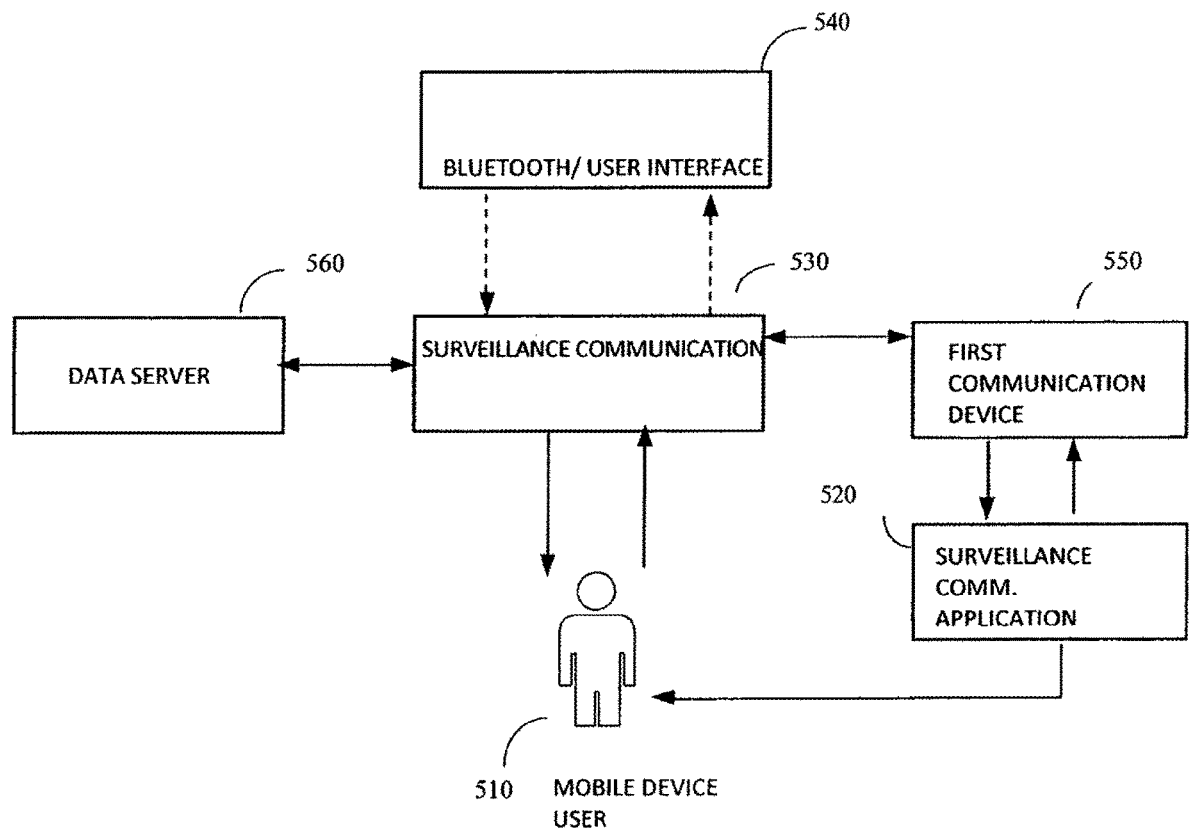

FIG. 5 this figure presents a system diagram for an exemplary system configuration consistent with certain embodiments of the present invention, according to a preferred embodiment of the invention.

DETAILED DESCRIPTION

The inventor has conceived, an apparatus for reading the temperature of CBD/THC concentrates or products without the need for holding and aiming a traditional infrared thermometer. The embodiment further allows users to read the temperature of various products by using a hands-free device.

Reference throughout this document to a first communication device refers to a variety of components that operates using any means of internet connection or similar modem that transmits packets of data that allow smart devices (such as phones, tablets, computers, handheld devices, game devices, etc.) to be updated when they receive data. The ability of a mobile device to collect such data is important when compiling critical information to relay to the user.

Reference throughout this document to a sensor refers to a variety of components that operates using any means of technology to detect the presence of an object or collect data. The term object may incorporate any obstruction or sizeable matter and is not limited to humans or animals.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

A description of an embodiment with several components in connection with each other does not imply that all such components are required. To the contrary, a variety of optional components may be described to illustrate a wide variety of possible embodiments of one or more of the inventions and in order to more fully illustrate one or more aspects of the inventions.

Mechanisms described or referenced herein will sometimes be described in singular form for clarity. However, it should be appreciated that particular embodiments may include multiple instantiations of a mechanism unless noted otherwise. Blocks in figures should may, in some embodiments be understood as representing segments or portions of those embodiments. Alternate implementations are included within the scope of embodiments of the present invention would be understood by those having ordinary skill in the art.

Definitions

CBD/THC concentrates as used herein are high potency extracts of the hemp plant and marijuana that contain high levels of cannabinoid CBD/THC.

A vertical infrared device as used herein may include an upward facing device connected to the body of the proposed embodiment for reading the temperature of various CBD/THC products by using infrared technology.

An LCD display as used herein refers to a screen that displays the various settings for the embodiment.

Control panel as used herein is a panel surface located beneath the LCD display for adjusting the settings.

The dish is an apparatus that individuals and groups utilize to place CBD/THC concentrates in to assist with consuming.

In an embodiment, the TempTech device is comprised of a body that is shaped with an angled top surface, front surface, rear surface, 2 sides, and a bottom. The angled top incorporates an LCD screen that is flush to the top-side surface of the angled body. The screen further aluminates to display multiple color screens depending on the selected functionality. The LCD screen also has various icons on the screen to allow a user to select various options while using the TempTech. The LCD icons will display symbols of critical functions such as a battery icon to provide notification of battery life remaining.

The LCD screen comprises a number of features for adjusting the reading capabilities. For instance, the embodiment will include 3 settings which will allow the user to set desired values such as "Min", "Max", and "Alarm". When the device is powered on and in scan mode, if the collected reading is below the "Min" value, the backlight will be blue and the word "Cold" will be displayed on the screen. If the scanned value is above the "Max" value, the backlight will be red and the word "Hot" will be displayed on the screen. If the reading is greater than or equal to the "Min" AND less than or equal to "Max", the backlight will be green and the word "Ready" will be displayed on the screen. In a non-limiting example, if the user set the "Min" value to 600° F., the "Max" value to 650° F., and the "Alarm" value to 630° F., the red backlight would be on and "Hot" would be displayed on the screen when the temperature reading reached 651° F. and above. Alternatively, if the reading was between 600° F. to 650° F., the green backlight would be on and display "Ready" on the screen. Under the same premise, when the scanned reading is at 599° F. or below, the Blue backlight would be on and "Cold" would be displayed on the screen. The audible alarm would go off at 630° F. In an alternative embodiment, the embodiment may include a "sleep" mode that dims the screen and stops scanning when it's turned on, but not in use. This option is mode will be used for conserving on battery and extending the life of the LCD screen. When the user is ready to use it again, they will merely press anyone of the function buttons to "wake" it up and continue reading the temperature.

The TempTech includes an upward facing infrared device that is critical at capturing temperature data from the external objects. The angle of the upward facing infrared device is critical because it allows for ease by allowing a user to simply position a CBD/THC product such as a dish above the upward facing infrared device without the need to aim. The infrared device can be designed adjacent to the left or right of the body. The infrared sensor device has an orifice cavity along the top side of the cylinder that utilizes traditional infrared technology to scan temperature signatures in a unique way. Users will find it easy to have the ability to hold a CBD/THC product over the orifice and have the device quickly scan its temperature. Further, it may become necessary to read the temperature of CBD/THC concentrates or products from a location other than below the dish, and so the TempTech can be configured to include an arm that is moveable. The arm will include the same infrared scanning capabilities as the upward facing infrared device except that the user will have the option to rotate and shift the arm in either an upward position or downward position and where necessary the user may fix the arm in an angle to scan the temperature in a desired position.

The embodiment includes at least three buttons that are used to control critical settings for adjusting temperature and power settings. When the user determines that the TempTech will need to conserve energy the embodiment can be placed in a "sleep" mode utilizing the designated buttons on the control panel. The control panel will also include buttons to set temperature parameters to notify the user in the event of abnormal temperature readings.

In a non-limiting example, the invention may even utilize Bluetooth technology for wireless devices and incorporate a software application that can be installed on mobile devices such as mobile phones and tablets to receive the temperature readings for data collection.

According to the embodiment, the invention has a DC port and a detachable power cord. The TempTech will allow users to remove the cord when necessary for purposes such as replacing a faulty cord due to damage and the like. The DC port will be designed in an ideal location along the rear panel of the TempTech.

Along the rear panel of the embodiment, the invention also includes an on/off power switch to allow the user to easily turn the power on and off depending on preference.

Further according to the embodiment, the invention will include a rechargeable lithium-ion battery. Combined with an optional "sleep" mode the battery life will last even longer and will be a great option to this invention.

In an embodiment, the TempTech utilizes a Bluetooth technology or similar technology that is connected to a surveillance communication system which communicates to a first communication device such as a computer, Android tablet, or iPhone etc. but is not limited to these examples. Once connected to the first communication device, the Bluetooth technology is in constant contact with both the surveillance communication system and the first communication at all-times and will continuously transmit data; in a non-limiting example, users may initiate additional functions by manually alerting the surveillance communication system installed on the TempTech.

Often devices that utilize traditional infrared scanning technology can encounter challenges where a distance to a target object is a factor. To elaborate, the accuracy of infrared technology is highly dependent on ratio distance to the target object. For instance, where a 1-inch object is 12 inches way from the infrared device temperature is often read without much difficulty. On the other hand, where a 2-inch target object is 24 inches away the sensor becomes more difficult to align and obtaining accurate temperature becomes more difficult. As a target gets further away, ratio as it relates to size, and distance of the target can greatly skew the temperature thus causing the data to be inaccurate. In a non-limiting example, TempTech can include a setting that will adjust the sensor reading capabilities to provide the sensor with a preselected distance in which the target is positioned which will allow the sensor to read accurate temperature data by taking into account the distance of the target.

In an ideal embodiment, the TempTech will provide a very user-friendly option to previous methods of using traditional infrared thermometers.

Exemplary Embodiments

Figure 1:
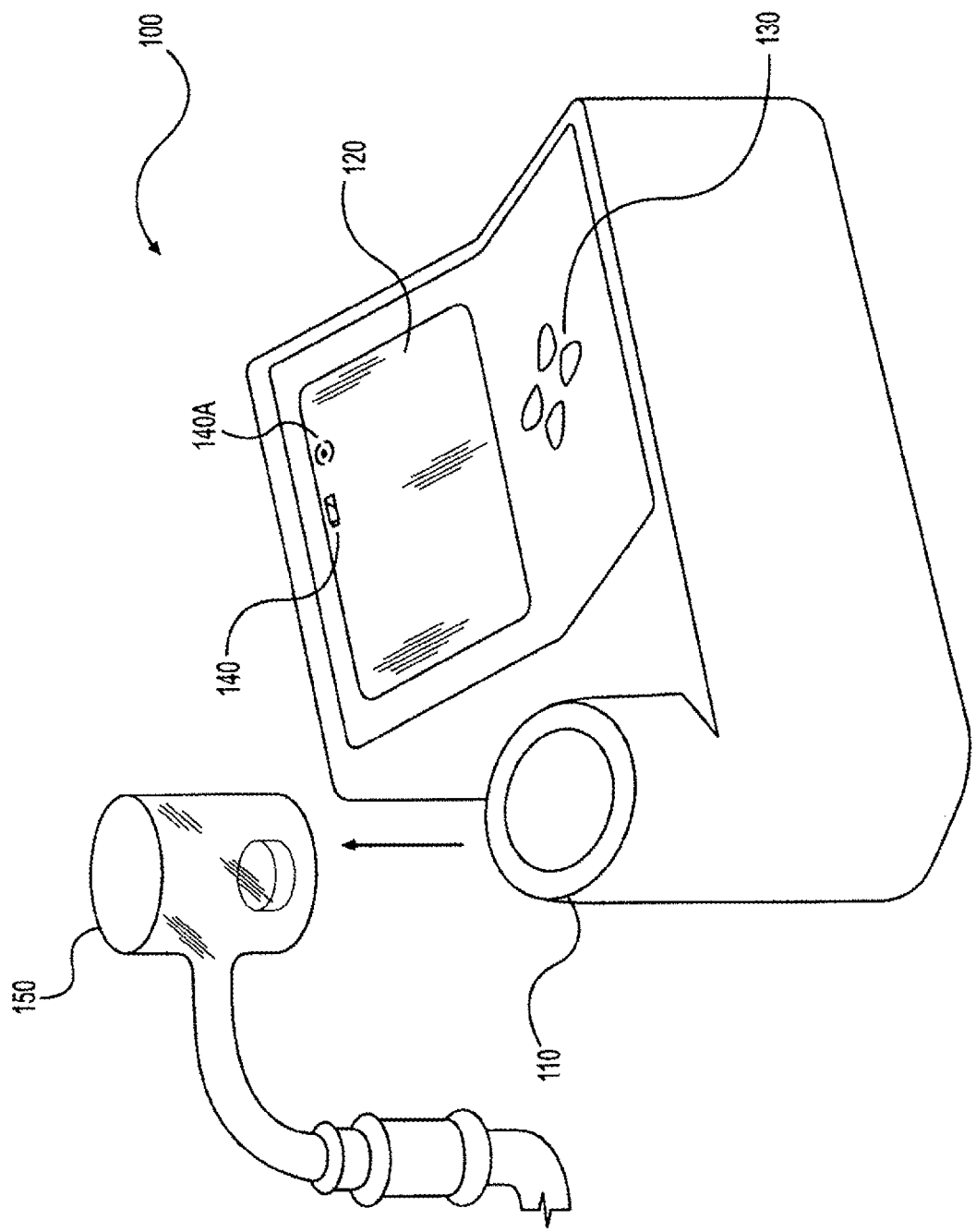
FIG. 1 is a perspective front-view of an apparatus for reading the temperature of CBD/THC concentrates or products without the need for holding and aiming a traditional infrared thermometer, the illustration also includes a perspective view of a dish positioned over the sensor, according to a preferred embodiment of the invention.

FIG. 1 is a perspective front-view of an apparatus for reading the temperature 100 of CBD/THC concentrates or products without the need for holding and aiming an infrared thermometer, according to a preferred embodiment of the invention. According to the embodiment an apparatus for reading the temperature of CBD/THC concentrates or products comprises an upright vertical sensor 110 for collecting temperature readings of a cylinder structure comprising a top surface with a ferruced opening. The dish 150 is positioned in a location above the upright vertical sensor 110. The upright vertical sensor device 110 is at least 1" wide by 2" in height with a ½" orifice depth. The apparatus 100 further includes a control panel 120 for adjusting the infrared readings for the CBD/THC concentrates or products. In a non-limiting example, the LCD screen 120 can be manufactured in black or a color that will be suitable for the user and also include an optional sleep mode to help preserve the life of the LCD screen 120. Beneath the center lower portion of the LCD screen 120 the embodiment includes at least three buttons 130 to make necessary adjustments. The LCD screen 120 further includes various icons 140 that will be displayed to assist the user with making necessary selections and or collecting information. The necessary adjustments include settings for scanning distance, minimum, maximum, and alarm settings to allow the user to be notified of critical parameters. In other embodiments, the apparatus 100 can include a rechargeable lithium-ion battery to increase the energy life of the apparatus.

Figure 2:
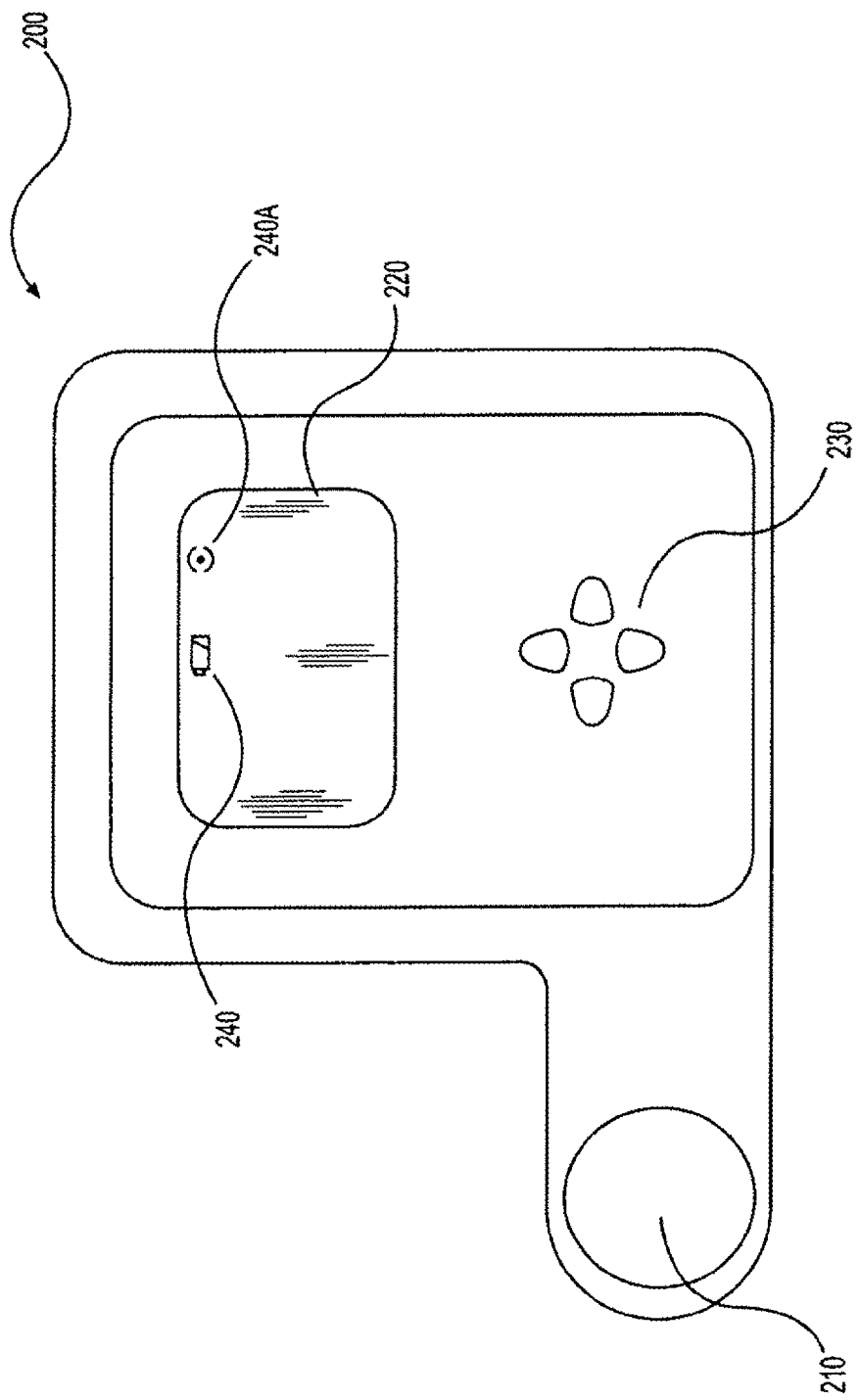
FIG. 2 is a top view illustrating an apparatus for reading the temperature of CBD/THC concentrates or products without the need for holding and aiming a traditional infrared thermometer, according to a preferred embodiment of the invention.

FIG. 2 is a top view illustrating an apparatus for reading the temperature 200 of CBD/THC concentrates or products without the need for holding and aiming an infrared thermometer, according to a preferred embodiment of the invention. According to the embodiment, apparatus for reading the temperature of CBD/THC concentrates or products comprises an upright infrared device 210 of a cylinder-shaped structure comprising a top surface with an orifice cavity that allows for temperature scanning. Advantageously, the embodiment includes an LCD display screen 220 for showing the collected temperature reading from the CBD/THC concentrates or products. The LCD screen further includes various icons 240 that will be displayed to assist the user with making necessary selections and or collecting information. The embodiment 200 further includes at least three buttons for making necessary adjustments.

Figure 3:
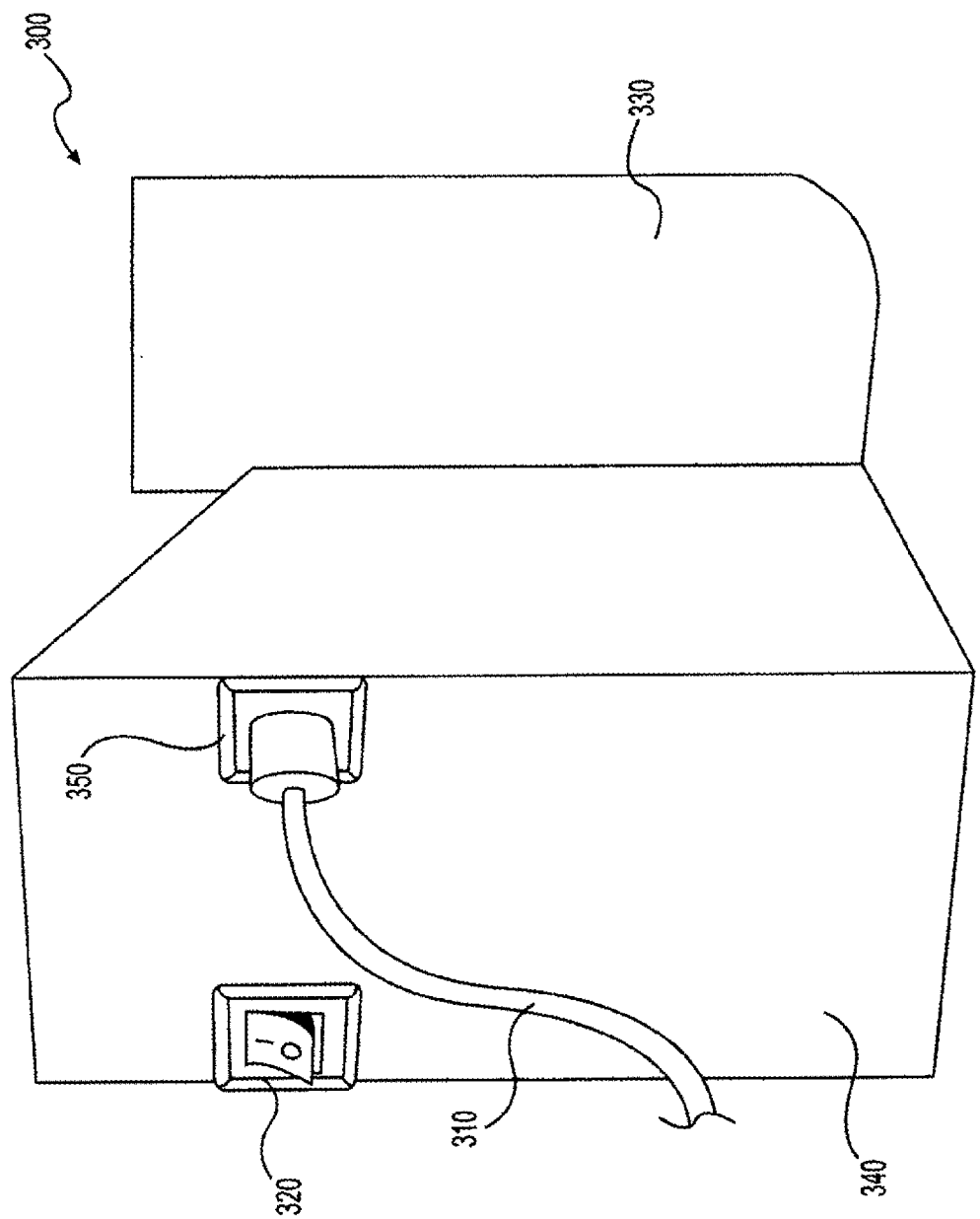
FIG. 3 is a rear view illustrating an apparatus for reading the temperature of CBD/THC concentrates or products without the need for holding and aiming a traditional infrared thermometer, according to a preferred embodiment of the invention.

FIG. 3 is a rear-view illustrating an apparatus for reading the temperature 300 of CBD/THC concentrates or products without the need for holding and aiming an infrared thermometer, according to a preferred embodiment of the invention. According to the embodiment, apparatus for reading the temperature of CBD/THC concentrates or products comprises a power on/off switch 310. The embodiment also includes a DC input port 320 to insert a power cord 330 when in use.

Figure 4:
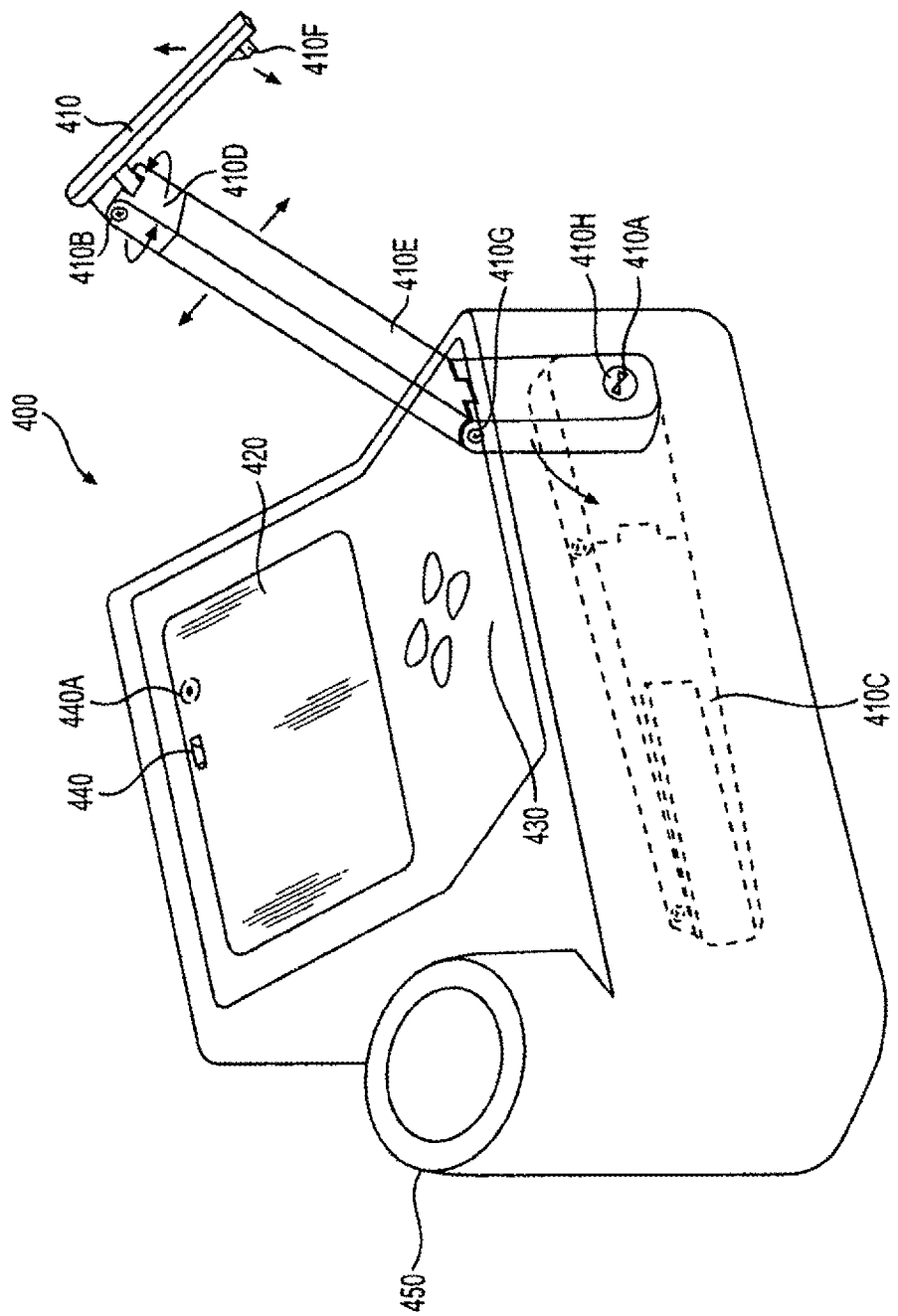
FIG. 4 is a perspective front-view of an apparatus for reading the temperature of CBD/THC concentrates or products without the need for holding and aiming a traditional infrared thermometer to include a moveable arm, according to a preferred embodiment of the invention.
Figure 4A:
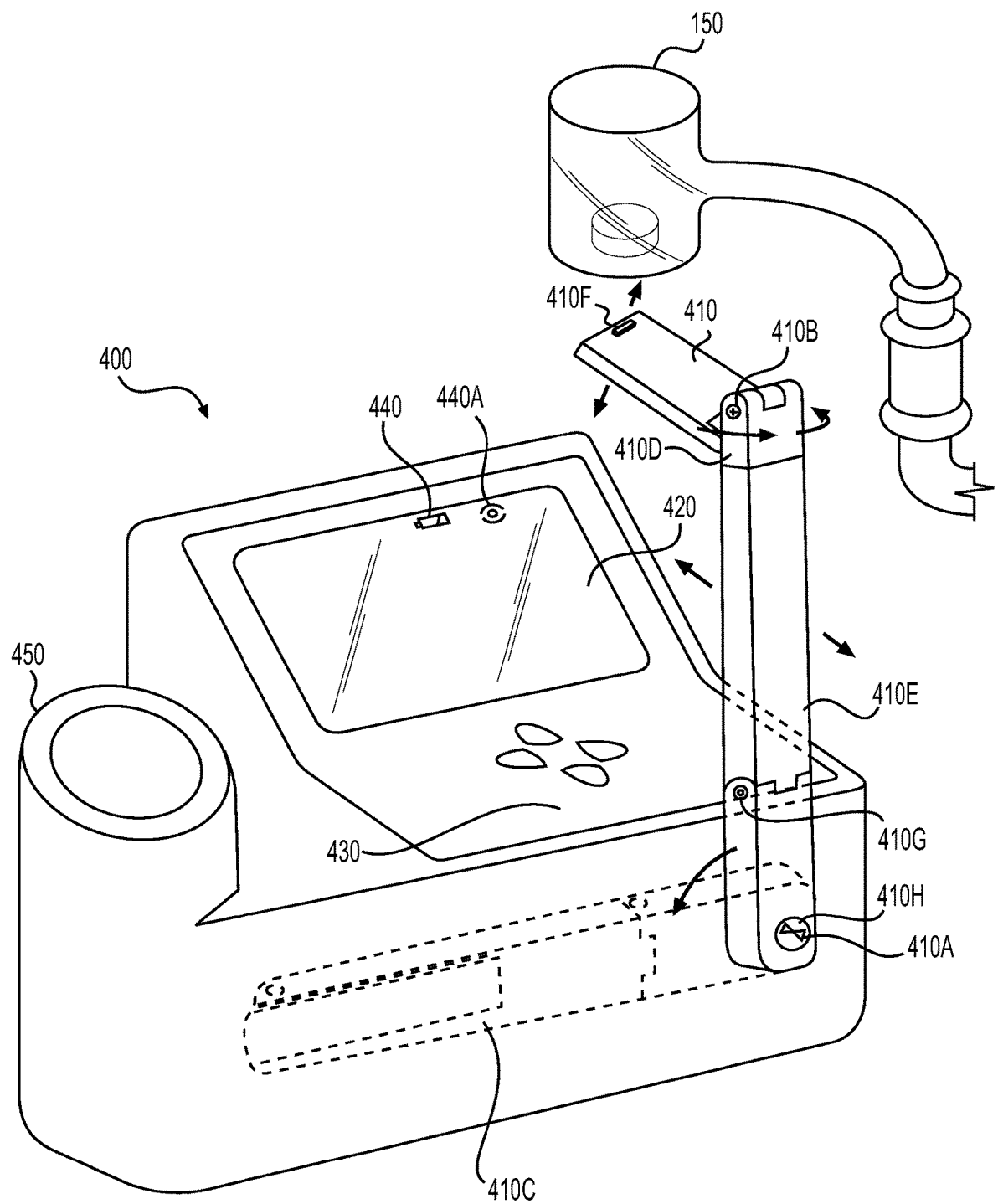
FIG. 4A is a second perspective front view of the apparatus of FIG. 4 showing the infrared sensor positioned below the dish.

FIG. 4 is a perspective front-view of an apparatus for reading the temperature 400 of CBD/THC concentrates or products without the need for holding and aiming an infrared thermometer, according to a preferred embodiment of the invention.

According to the embodiment an apparatus for reading the temperature of CBD/THC concentrates or products comprises an upright vertical sensor 450 for collecting temperature readings of a cylinder structure comprising a top surface with a ferruced opening. The upright vertical sensor device 450 includes an alternate rotating arm 410. The rotating arm includes a scanning sensor 410F, a swivel head 410D, an upper rotating hinge 410B, a middle rotating hinge 410G, and lower rotating hinge 410H. Accordingly, the upper, middle, and lower hinges all have a locking mechanism 410A that can be used to lock the hinges in a fixed position. The apparatus 400 further includes a control panel 420 for adjusting the infrared readings for the CBD/THC concentrates or products. In a non-limiting example, the LCD screen 420 can be manufactured in black or a color that will be suitable for the user and also include an optional sleep mode to help preserve the life of the LCD screen 420. Beneath the center lower portion of the LCD screen 420 the embodiment includes at least three buttons 430 to make necessary adjustments. The LCD screen 420 further includes various icons 440 that will be displayed to assist the user with making necessary selections and or collecting information. The necessary adjustments include settings for scanning distance, minimum, maximum, and alarm settings to allow the user to be notified of critical parameters.

FIG. 5, this figure presents a system diagram for an exemplary system configuration consistent with certain embodiments of the present invention. A system for communicating data to a first communication device 500. A mobile device may be utilized by the user 510 where information may be transmitted for use by an application 520. A user may initiate the surveillance communication system 530 by utilizing a Bluetooth 540 enabled first communication device 550. When the system is initiated, the surveillance communication system 530 sends information data collected through Bluetooth technology 540, containing temperature data that can be stored in a data server 560. The surveillance communication system 530 may as an option store the transmitted temperature data in a server 560 for historical purposes.

The skilled person will be aware of a range of possible modifications of the various embodiments described above. Accordingly, the present invention is defined by the claims and their equivalents.

What is claimed is:

1. An apparatus for reading a temperature of an object, comprising:
   a housing comprising:
      a control panel comprising a button configured for selecting a temperature setting for the object, wherein the object is a CBD or THC product and the temperature setting is associated with a preferred temperature for consuming CBD or THC,
      a display screen operatively connected to the control panel and configured for displaying the temperature setting for the object, and
      a jointed arm operatively connected to the housing, wherein the jointed arm comprises an infrared temperature sensor attached thereto, the infrared temperature sensor configured for measuring the temperature of the object.

2. The apparatus of claim 1, wherein the jointed arm comprises a first end and a second end, wherein the first end is operatively attached to the housing and the second end comprises the infrared temperature sensor attached thereto.

3. The apparatus of claim 1, wherein the jointed arm is movable to a position in which the infrared temperature sensor is positioned proximate to the object.

4. The apparatus of claim 1, further comprising an alarm configured for activation when the measured temperature of the object reaches the temperature setting.

5. The apparatus of claim 1, wherein the jointed arm is movable to a position in which the infrared temperature sensor is positioned below the object.

6. The apparatus of claim 1, further comprising a surveillance communication system configured for transmitting data related to the temperature setting, the measured temperature of the object, or a combination of both.

7. An apparatus for reading a temperature of an object, comprising:
   a housing comprising:
      a control panel comprising a plurality of buttons configured for selecting a temperature setting for the object,
      a display screen operatively connected to the control panel and configured for displaying the temperature setting for the object, and
      a support arm operatively connected to the housing, wherein the support arm comprises an infrared temperature sensor attached thereto, the infrared temperature sensor configured for measuring the temperature of the object,
      wherein the support arm comprises an adjustable joint configured to support the infrared temperature sensor in a fixed position, and
      wherein the object is a CBD or THC product.

8. The apparatus of claim 7, wherein the support arm is movable to support the infrared temperature sensor at a plurality of different heights relative to the housing.

9. The apparatus of claim 7, wherein the infrared temperature sensor is positioned in a direct line of sight of the object without an intervening obstruction.

10. The apparatus of claim 7, wherein the support arm is configured to support the infrared temperature sensor in a fixed position below the object.

11. The apparatus of claim 7, wherein the support arm comprises a first end and a second end, wherein the first end is operatively attached to the housing and the second end comprises the infrared temperature sensor attached thereto.

12. The apparatus of claim 7, wherein the infrared temperature sensor is movable in a horizontal direction and a vertical direction.

13. The apparatus of claim 7, wherein the infrared temperature sensor is supported in a fixed position above the housing.

14. An apparatus for reading a temperature of an object, comprising:
   a housing comprising:

a control panel comprising a plurality of buttons configured for selecting a temperature setting for the object, a display screen operatively connected to the control panel and configured for displaying the temperature setting for the object, and a support arm operatively attached to the housing, wherein the support arm comprises an infrared temperature sensor attached thereto and configured for measuring the temperature of the object, wherein the infrared temperature sensor is movable relative to the housing, wherein the support arm is configured to hold the infrared temperature sensor in a position above the housing, and wherein the object is a CBD or THC product.

15. The apparatus of claim 14, wherein the support arm comprises a joint configured to support the infrared temperature sensor in a fixed position.

16. The apparatus of claim 14, wherein the temperature setting comprises a minimum temperature setting, a maximum temperature setting, a desired temperature setting, or any combination thereof.

17. The apparatus of claim 16, wherein the display screen is configured to display a visual signal when at least one of the following occurs: the measured temperature of the object is below the minimum temperature setting, the measured temperature of the object is above the maximum temperature setting, and the measured temperature of the object is between the minimum temperature setting and the maximum temperature setting.

18. The apparatus of claim 14, wherein the support arm is rotatable to support the infrared temperature sensor in a plurality of different positions relative to the housing.

* * * * *